April 2, 1957
N. J. ALBANES
2,787,514
CIRCUIT ARRANGEMENT AND METHOD FOR
WRITING MAGNETIC INFORMATION
Filed Nov. 13, 1953
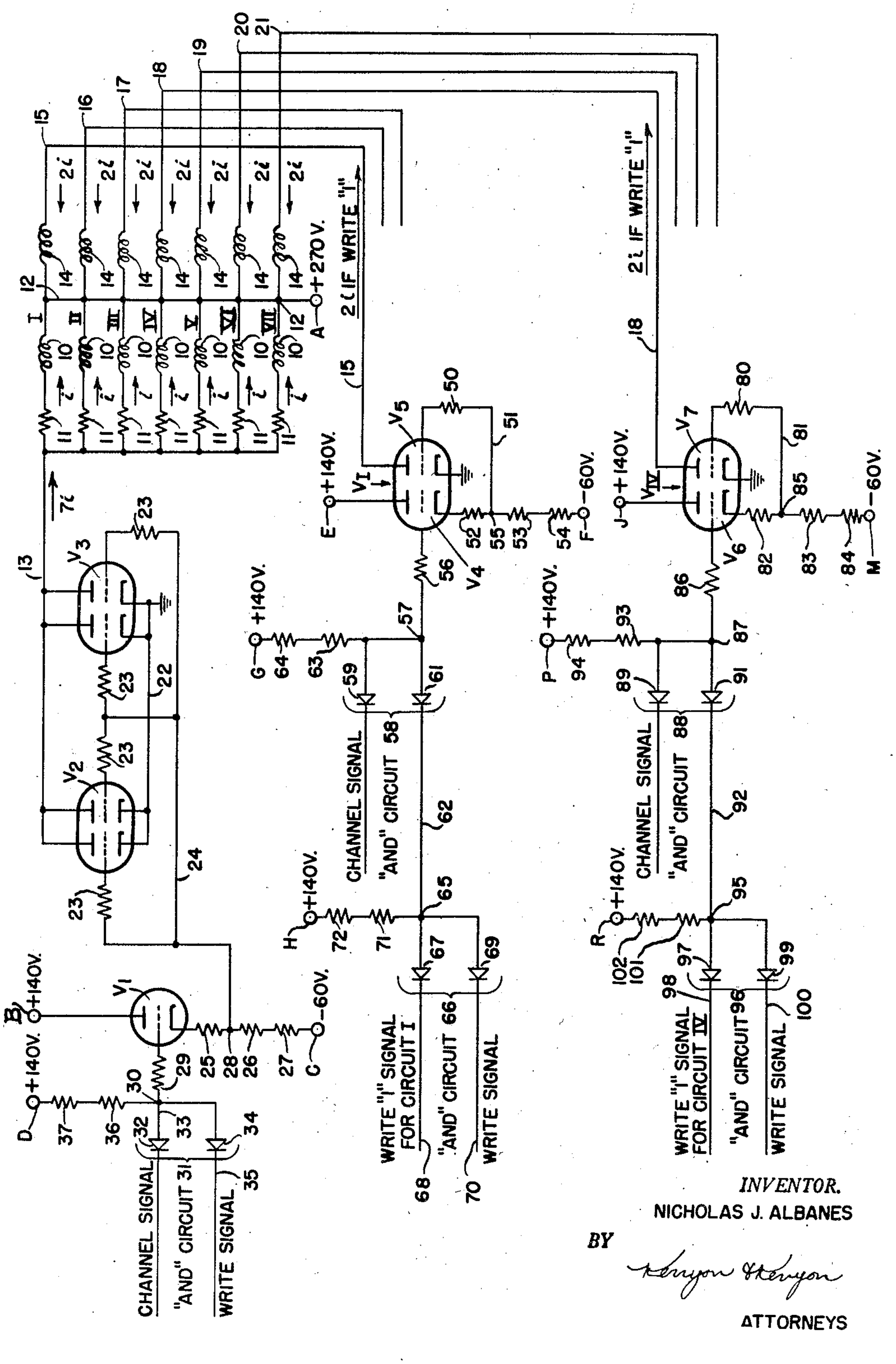
INVENTOR.
NICHOLAS J. ALBANES
BY Kenyon & Kenyon
ATTORNEYS 2,787,514

CIRCUIT ARRANGEMENT AND METHOD FOR WRITING MAGNETIC INFORMATION

Nicholas J. Albanes, Poughkeepsie, N. Y., assignor to International Business Machines Corporation, New York, N. Y., a corporation of New York Application November 13, 1953, Serial No. 391,937

10 Claims. (Cl. 346—74)

This invention relates to circuital arrangements and methods for addressing a magnetic surface, for example, on a drum for writing or recording information in the form of magnetic spots on the surface by the delivery of electrical writing energy currents in the form of pulses to write coil sections of a plurality of magnetic writing heads which latter are arranged relative to the magnetic surface to deliver magnetic spot writing flux pulses to it.

In addressing magnetic drums as hereinbefore mentioned, groups each comprising a plurality of magnetic writing heads are arranged to respectively overlie separate areas of a magnetic surface. Each group of magnetic writing heads is intended to write magnetic information on the area underlying it in response to instructions received from a specified channel source of signals. The magnetic writing heads in each group make independent magnetic writings, for example, in the form of magnetic spots on the magnetic surface. In other words, each writing head in a group is intended to record a fragment or bit of information as instructed by signals received from a specific channel. In the instant application, any magnetic spot written on the magnetic surface by a writing head is intended to be a record on the surface of a first or a second type of magnetically written information. The first type of magnetically written spot in this invention is a so-called write "0" spot. The second type of magnetically written spot in this invention is a so-called write "1" spot. The writing instructions received by each writing head thus must be energizing currents that will provide a write "0" magnetic writing flux or a write "1" magnetic writing flux to the specific writing head.

In the past the write "0" writing flux and the write "1" writing flux for each writing head of a channel group has been supplied by use of electron discharge means such as triode vacuum tubes, one set of such tubes being utilized to provide the necessary write "0" instructing current for each writing head and another set of such tubes being utilized to provide the write "1" instructing current for each writing head. This has required the use of large numbers of vacuum tubes and has involved complicated and expensive cabling.

Features and objects of the invention are the provision of circuital arrangements that will reduce materially the number of vacuum tubes required and also reduce cabling complexities and costs to a minimum. These features and objects in a general way are accomplished by making as many of the vacuum tubes and necessary cabling common to as many of the energizing or writing coils of writing heads as is possible.

In the embodiment of the invention hereinafter shown and described in detail a single set of vacuum tubes is utilized in a common circuit arrangement to supply the necessary write "0" energizing currents simultaneously from a common source of electrical energy for all seven write "0" energizing coil sections of the energizing coils of seven writing heads of a selected channel. Common cabling between this set of tubes and the said energizing coil sections reduces the cost of necessary tubes for effectively energizing the coils of all seven heads sevenfold. The energizing coil of each head also includes a write "1" coil section. Separate electron discharge means in the form of vacuum tubes and separate circuits are required to control independently the selective supply of write "1" energizing currents to each of the seven write "1" coil sections. The same source of electric energy, however, may be utilized for supplying both the write "0" and write "1" energizing currents for the respective coil sections of all the write head coils. Use of the same source and of as much common cabling as possible as will be presently described between the source and respective coil sections of the respective writing heads provide material savings in cabling costs and material reduction in cabling complexities. There may, of course, be more than or less than seven heads in a group. The savings are commensurate with the number of heads in a group.

In the circuital arrangement of this invention current pulses which are utilized to energize the respective write "0" and write "1" coil sections of the energizing coils of the individual writing heads are all derived from the common source of electric energy by the use of triode tubes in the associated circuits which become conducting in response to control signals from conventional "and" circuit means. Whenever the proper tubes become conducting as instructed by said signals, the required energizing current flows in the proper writing coil sections of the various heads.

Objects and features of the invention are to provide electrical circuits and means for supplying write coil energizing currents of proper magnitude or intensity and direction from the common source to the write coil sections of the respective writing heads to cause any of them to write either "0" or "1" magnetically as instructed upon the magnetic surface and in which the number of vacuum tubes and circuit connections between them and the sections of write coils are reduced to a minimum.

Further objects and features of the invention are the provision of manufacturing economies as a result both of material reduction in the necessary number of vacuum tubes and other component parts required in the circuit arrangement and of reduction in cabling time and in labor required to connect the various circuit components together.

Further objects and features of the invention are the provision of a novel method of energizing a plurality of magnetic writing heads to cause any thereof to effect magnetic writing of either of two types of magnetic information by the use of electric energies of different magnitudes or intensities derived from a common electrical energy source.

Further objects and features of the invention are to provide a method of connecting a plurality of magnetic writing heads to a common electrical energy source and to supply electrical energies of two different kinds from said source to all of said heads as desired whereby when electrical energy of one kind is supplied to all the writing heads from the source all will tend to write magnetic information of one type unless electric energies of both kinds are supplied from said source simultaneously and in opposition to each other to selected of the writing heads in which event those selected writing heads will instead write magnetic information of a second type rather than the first type.

Further objects and features of the invention are to effect material savings in required parts and in cabling costs by the practice of the said methods.

Other objects and features of the invention will become apparent from the following description and the accompanying drawing which is a wiring diagram of an electric circuit embodying the invention.

Referring to the drawing, a plurality, in this instance seven, write "0" energizing coil sections 10 one for each of seven, independent magnetic writing heads are provided. The writing heads themselves being of conventional construction are not shown. A balancing resistor 11 is connected in series with each coil section 10. The use of the balancing resistors 11 is optional. All of the coil sections 10 have the same number of turns (50 in this embodiment) and the balancing resistors 11 each have the same magnitude (680 ohms in this embodiment). All seven of the coil sections 10 are connected to a common wire or line 12 leading to a common electrical energy source of positive potential at A, in this instance +270 volts. All seven of the balancing resistors 11 are connected to a common plate lead wire 13. The seven branch circuits I–VII, inclusive, each consisting of a write "0" coil section 10 and a balancing resistor 11 are thus in electrical parallel connection between said plus line 12 and said plate lead wire 13. Any current caused to flow from the plate lead wire 13 to the positive potential at A via line 12, as will be presently described, subdivides into the seven like branch circuits I–VII, inclusive, so that currents $i$ of equal magnitude flow in each said branch circuit simultaneously. The current $i$ in each branch circuit is a write "0" current for each. Since this current "$i$" flows simultaneously in the seven write "0" coil sections 10, the seven writing heads with which said sections are independently associated all will write "0" simultaneously unless instructed differently.

In order to provide different writing instructions independently as desired for each of the seven writing heads, its write coil also includes a write "1" coil section 14. One write "1" coil section 14 is connected to each write "0" coil section 10. Thus, one write "0" coil section 10 and one write "1" coil section constitutes the write coil for one of each of the seven writing heads. All the write "1" coil sections 14 have identical numbers of turns (50 in the present embodiment) and other electrical characteristics. The terminal of each write "1" coil section 14 which is connected to the corresponding write "0" coil section 10 of one of the seven branch circuits I–VII, inclusive, is also thereby connected to the common line 12 leading to the common electrical energy source of positive potential at A. The other terminals of the write "1" coil sections 14 are connected to seven independent lead wires 15, 16, 17, 18, 19, 20 and 21, respectively, so that a write "1" current of $2i$ magnitude may be caused to flow independently from any one or more of the seven independent lead wires to the positive potential at A, in this instance +270 volts, through any selected ones of the seven write "1" coil sections 14 in opposite direction to the write "0" $i$ current flowing in the respective write "0" coil sections 10 that are connected to such selected write "1" coil sections 14.

In order to provide for flow of a write "0" $i$ current flow simultaneously in all the seven write "0" coil sections to the +270 volt potential at A, electron discharge means comprising a single triode vacuum tube $V_1$ and a pair of twin triode vacuum tubes $V_2$ and $V_3$ are provided. Vacuum tubes $V_2$ and $V_3$ are well known RMA 5687 type tubes and vacuum tube $V_1$ is also a well known type being ½ of a 5687 type tube.

The four plates of the two twin triode tubes $V_2$ and $V_3$ are all connected to the common plate lead wire 13. The four cathodes of the two twin triode tubes $V_2$ and $V_3$ are all connected to the common grounded wire 22.

Four grid resistors 23 all of equal value and in this embodiment each having a value of 150 ohms are connected, respectively, to the four grids of the twin triode tubes $V_2$ and $V_3$. Each grid resistor 23 is also connected to the common grid lead wire 24. Thus, the two twin triodes $V_2$ and $V_3$ are in effect connected in multiple or electrical parallel and always operate in unison. The tubes $V_2$ and $V_3$ are normally maintained in non-conducting condition by appropriate bias on their grids as will be presently described. Conduction in said twin triode tubes $V_2$ and $V_3$ from their cathodes to their plates to provide said "$i$" current for each branch circuit I–VII, inclusive, simultaneously is controlled by the single control triode tube $V_1$ as will now be described.

The plate of tube $V_1$ is connected at B to a source of positive electrical potential in this instance +140 volts. The cathode of tube $V_1$ is connected through the series connected resistors 25, 26 and 27 to a source of negative electrical potential at C, in this instance −60 volts. Resistor 25 in this embodiment has a value of 200 ohms. Each resistor 26 and 27, in this embodiment, has a value of 1800 ohms. A single resistor having the total ohmic resistance of resistors 26 and 27 may replace them if desired.

The grid lead 24 from the tubes $V_2$ and $V_3$ is connected to the junction 28 between the resistors 25 and 26. This connection provides a negative bias from the −60 volt biasing source at C, via lead 24 through the four grid resistors 23 to all four grids of the twin triode tubes $V_2$ and $V_3$ and maintains them in a normally non-conducting condition unless control triode tube $V_1$ is made conducting ("fired") as will now be described.

A grid resistor 29 connects the grid of the triode $V_1$ to the input junction 30 of a conventional "and" circuit 31. This "and" circuit includes, for example, the germanium diode 32 connected to a selected channel lead wire 33 and, for example, the germanium diode 34 connected to a write signal lead wire 35. The junction 30 is connected through the in series resistors 36 and 37 at D to a source of positive electrical potential in this instance +140 volt source. In the embodiment shown, resistors 36 and 37 have respectively the values of 15,000 ohms and 18,000 ohms. A single resistor having the total ohmic value of these two resistors may be substituted. With the "and" circuit arrangement shown, a cut off bias is normally maintained on the grid of control tube $V_1$ and it is non-conducting. Tube $V_1$ only becomes conducting upon the simultaneous appearance of positive voltage pulses from the leads 33 and 35 of the "and" circuit 31 at both diodes 32 and 34. Such simultaneous appearance blocks current flow through both diodes 32 and 34 to the +140 volt source at D. A plus pulse then appears at the junction 30 which is transmitted through grid resistor 29 to the grid of tube $V_1$. This plus pulse fires control tube $V_1$. It is sufficient to render control tube $V_1$ conducting, allowing current to flow from the −60 volt source at C through resistors 27, 26 and 25, through the tube $V_1$ to the +140 volt potential at B. This current flow in tube $V_1$ changes the biasing potential at junction 28 because of the voltage drops across the resistors 26 and 27. As a result, the bias on the four grids of the tubes $V_2$ and $V_3$ is changed and both tubes $V_2$ and $V_3$ become conducting, allowing current to flow from the four grounded cathodes of said two tubes through the said tubes to the plate lead 13, through all seven branch circuits I–VII, inclusive (each consisting of a write "0" coil section 10 and a balancing resistor 11), to the positive potential of +270 volts at A via the common connecting line 12. The current in plate lead 13 then has a $7i$ magnitude which is equally divided into a current of $i$ magnitude flowing in each write "0" coil section 10 of each of the branch circuits I–VII, inclusive. The seven writing heads (not shown) with which the seven respective write "0" coil sections 10 are independently associated thus will each be provided simultaneously with a write "0" flux for writing a "0" spot on the magnetic surface as a result of the $i$ current so appearing in each of the seven write "0" coil sections 10.

To provide a write "1" flux for any selected ones of the seven writing heads, the write "1" coil sections 14 of those writing heads which are selected to write "1" must be energized by a current of $2i$ magnitude flowing in reverse direction therethrough to the direction of flow of the $i$ current in the write "0" coil sections 10 associated with the selected writing heads. When such a $2i$ current flows in any selected write "1" coil section 14, the flux therefrom is in opposition to the flux caused by the $i$ current simultaneously flowing in the write "0" coil sections 10 associated with such selected write "1" coil sections. This $2i$ current flux overcomes the "$i$" current flux and the selected write heads then write "1" spots rather than "0" spots on the magnetic surface.

While all the write "1" coil sections 14 are connected to the +270 volt line 12 at their junctions with the write "0" coil sections 10, the other terminal of each coil section 14 is connected in an independent electrical circuit.

Electron discharge means in this embodiment comprising a single twin triode tube $V_I$ of the 5687 type hereinbefore described is provided. This $V_I$ tube comprises the control tube section $V_4$ and the $2i$ current providing section $V_5$.

Lead 15 from the write "1" coil section 14 that is connected at one end to the write "0" coil 10 of branch circuit I is connected at the other end to the plate of the section $V_5$. The cathode of tube section $V_5$ is grounded. Grid resistor 50 is connected to the grid of tube section $V_5$ and to a grid lead 51. This resistor in the instant application has a value of 150 ohms.

The plate of control tube section $V_4$ is connected at E to a source of positive electrical potential, in this instance +140 volts. The cathode of tube section $V_4$ is connected through the in series resistors 52, 53, 54 to a source of negative electrical potential, in this instance −60 volts at F. Resistors 52, 53 and 54 in this instance have values, respectively, of 200 ohms, 1,800 ohms and 1,800 ohms. A single resistor having the total ohmic value of resistors 53 and 54 may be substituted therefor. The grid lead 51 from tube section $V_5$ is connected to the junction 55 between the resistors 52 and 53.

A grid resistor 56 which in this embodiment has a value of 150 ohms is connected to the grid of control tube section $V_4$ and to the junction 57 of an "and" circuit 58. This "and" circuit 58 includes, for example, the germanium diode 59 with its channel lead wire 60 and, for example, the germanium diode 61 and lead wire 62. Preferably the channel lead wire 60 is connected to the same selected channel pulse source as that connected to lead wire 33. Both diodes 59 and 61 are connected through the series connected resistors 63 and 64, in this instance, respectively, of 15,000 and 18,000 ohms to a source of positive electrical potential, in this instance +140 volts, at G. A single resistor having the total ohmic value of resistors 63 and 64 may be substituted therefor. Lead wire 62 from diode 61 is connected to the junction point 65 of a second "and" circuit 66. This second "and" circuit 66 includes, for example, the germanium diode 67 with its lead wire 68, and a second germanium diode 69 with its lead wire 70.

Lead wire 68 comes from a signal source (not shown) which must provide a plus voltage pulse at diode 67 when a write "1" is to be effected by the write head bearing the write "1" coil section 14 which is connected to the write "0" coil section 10 of branch circuit I. Lead wire 70 comes from a different instructing signal source (not shown) which must provide a plus voltage pulse at diode 69 simultaneously with the pulse appearing at diode 67 to activate the particular write head of branch circuit I to write "1" rather than "0" as will be described more in detail.

Diodes 67 and 69 and junction point 65 are connected by the in series resistors 71 and 72 (in this instance of the same ohmic values as resistors 36 and 37) to a source of positive electrical potential, in this instance +140 volts, at H. A single resistor whose total ohmic value is that of resistors 71 and 72 may be substituted therefor.

With the connections shown both tube sections $V_4$ and $V_5$ of the $V_I$ tube are normally non-conducting because of the biasing voltages on their respective grids. Whenever control tube section $V_4$ is "fired" by signals to its "and" circuits 58 and 66 as will be described it becomes conducting. This permits flow of current from the −60 volt source at F through resistors 54, 53 and 52, to the cathode of tube section $V_4$ and through said tube section to the +140 potential at E. The grid bias of tube section $V_5$ is thus changed because of the voltage drop across resistors 53 and 54 and tube section $V_5$ becomes conducting. When tube section $V_5$ becomes conducting a current $2i$ flows from the grounded cathode of tube section $V_5$, through said tube section, through lead wire 15, through the branch I connected write "1" coil section 14 to the positive potential of +270 volts at A via line 12. This $2i$ current flow is in opposite direction to the $i$ current simultaneously flowing in the write "0" coil section 10 of branch circuit I and the flux from the said $2i$ current easily overcomes the flux of the said $i$ current and causes the particular write head with which the said two particular write "0" and write "1" coil sections 10 and 14 are associated to write a "1" rather than a "0" on the magnetic surface.

To "fire" or render control tube section $V_4$ conducting, plus signal pulses must arrive simultaneously at all four diodes 59, 61, 67 and 69 via the respective leads 60, 62, 68 and 70 of the two "and" circuits 58 and 66. Unless this condition is fulfilled control tube section $V_4$ remains non-conducting and in consequence tube section $V_5$ is also non-conducting and no $2i$ current flows in the particular write "1" coil section 14 connected to lead 15.

The leads 16, 17, 18, 19, 20 and 21 connected to the respective other write "1" coil sections 14 that are connected to the respective write "0" coil sections 10 of the other branch circuits II, III, IV, V, VI and VII are each connected independently with different independent twin triode tubes identical with the twin triode $V_I$ in the same way as lead 15 has been connected to the $V_I$ tube. Each set of these other twin triodes is independently controlled by pairs of "and" circuits similar to the pairs of "and" circuits 58 and 66 so that a $2i$ current may be caused to flow independently in the same way in any selected one or more of said leads 16–21, inclusive, and consequently in the specific write "1" coil sections 14 connected to such selected leads and thus direct any selected write head to write a "1" spot rather than a "0" spot on the magnetic surface. As all the circuits and components thereof for providing $2i$ current in any selected of the leads 16, 17, 18, 19, 20 and 21 are similar to the circuit and components for providing $2i$ current flow in lead 15, the circuit and components for providing $2i$ current in lead 18 only is shown additionally in the drawings. Lead 18 provides for the $2i$ current in the write "1" coil section 14 that is in series with the write "0" coil section 10 of the branch circuit IV.

As can be seen from the drawings, in this embodiment a single twin triode tube $V_{IV}$ of the 5687 type hereinbefore described is provided. This $V_{IV}$ tube which has an identical function as that of the $V_I$ tube comprises the control tube section $V_6$ and the $2i$ current providing section $V_7$. Control tube section $V_6$ is connected to "and" circuits to function in the same way as control tube section $V_4$ and tube section $V_7$ is connected to lead 18 to function in the same way with respect thereto as does tube section $V_5$ with respect to lead 15.

For achieving this effect, lead 18 from the write "1" coil section 14 that is connected to the write "0" coil 10 of branch circuit IV is connected to the plate of tube section $V_7$. The cathode of tube section $V_7$ is grounded. Grid resistor 80 is connected to the grid of tube section $V_7$ and to a grid lead 81. This resistor in the embodiment shown has a value of 150 ohms.

The plate of control tube section $V_6$ is connected at

J to a source of positive electrical potential, in this instance +140 volts. The cathode of tube section $V_6$ is connected through the in series resistors 82, 83 and 84 to a source of negative electrical potential, in this instance −60 volts, at M. Resistors 82, 83 and 84 have ohmic values identical, respectively, to those of resistors 52, 53 and 54. A single resistor having the total ohmic value of resistors 83 and 84 may be substituted therefor. The grid lead 81 from tube section $V_7$ is connected to the junction 85 between the resistors 82 and 83.

The grid resistor 86 whose value is similar to that of grid resistor 56 is connected to the grid of control tube section $V_6$ and to the junction 87 of an "and" circuit 88. This "and" circuit 88 includes, for example, germanium diode 89 and its channel lead wire 90 and also, for example, germanium diode 90 and its lead wire 92. Preferably the channel lead wire 90 is connected to the same channel pulse source as channel lead wires 33 and 60. Both diodes 89 and 91 are connected through the series connected resistors 93 and 94, respectively, of 15,000 and 18,000 ohms to a source of positive electrical potential, in this instance +140 volts, at P. A single resistor having the total ohmic value of resistors 93 and 94 may be substituted therefor. Lead wire 92 from diode 91 is connected to the junction point 95 of a second "and" circuit 96. The latter includes, for example, a germanium diode 87 with its lead wire 98 and, for example, a second germanium diode 99 with its lead 100.

Lead wire 98 comes from a signal source (not shown) which must provide a plus voltage pulse at diode 97 when a write "1" is to be effected by the write head bearing the write "1" coil section 14 which is connected to the write "0" coil section 10 of the branch circuit IV. Lead wire 100 comes from a different instructing signal source (not shown) which must provide a plus voltage pulse at diode 99 simultaneously with the plus voltage pulse appearing at diode 97 to activate the write head of branch circuit IV.

Diodes 97 and 99 and junction joint 95 are connected by the in series resistors 101 and 102, in this instance, respectively, of 15,000 and 18,000 ohms to a source of positive electrical potential, in this instance +140 volts, at R. A single resistor having the total ohmic value of these two resistors may replace them.

With the connections shown both tube sections $V_6$ and $V_7$ of the $V_{IV}$ tube are normally non-conducting because of the biasing voltages appearing on their respective grids and no $2i$ current ordinarily flows in lead 18 or in the write "1" coil section 14 connected to said lead. When plus pulses appear simultaneously at all four diodes 89, 91, 97 and 99, control tube section $V_6$ is "fired" and becomes conducting in the same way as control tube section $V_4$. As a result tube section $V_7$ similarly to tube section $V_5$ becomes conducting and a current $2i$ flows from the grounded cathode of tube section $V_7$, through said tube section, through lead wire 18, through the branch IV connected write "1" coil section 14 to the positive potential of +270 volts at A via line 12. This $2i$ current flow is in opposite direction to the $i$ current flowing simultaneously in the write "0" coil section 10 of branch IV and the flux of said $2i$ current easily overcomes the flux of said last named $i$ current and causes the write head of branch circuit IV to write a "1" rather than a "0" on the magnetic surface. Unless control tube section $V_6$ is "fired" or rendered conducting by simultaneous arrival of plus signal pulses at all four diodes 89, 91, 97 and 99 from the two "and" circuits 88 and 96, tube section $V_7$ remains non-conducting and no $2i$ current flows in lead 18 or in the write "1" coil section 14 connected thereto.

With the circuital arrangements shown it is readily seen that the three tubes $V_1$, $V_2$ and $V_3$ are common to all seven branch circuit write "0" coil sections 10 and supply the write "0" $i$ current simultaneously in all seven of these coil sections. Whenever these tubes $V_1$, $V_2$ and $V_3$ are activated as hereinabove described by signals from the "and" circuit 31, all seven write heads are energized and will write "0" as a result of said $i$ current flowing in each branch circuit I–VII, inclusive, unless different instructions are received by the flow of reversely directed $2i$ current in any selected write "1" coil sections 14. Any of the said seven heads may instead be selected and instructed to write a "1" by effecting $2i$ current flow of reverse direction in the write "1" coil section 14 associated with such selected heads by independently activated separate tubes, i. g. tubes like tubes $V_I$ or $V_{IV}$ as herein described. The $2i$ current flowing in any such selected write "1" coil sections 14 overcomes the flux of the $i$ current flowing simultaneously in the write "0" coils 10 connected to such write "1" coil sections 14 and heads activated simultaneously both by $i$ and $2i$ current caused fluxes, write "1" rather than "0" on the magnetic surface. The same common electrical energy source of positive potential of −270 volts at A is used to provide both the $i$ and $2i$ currents.

The arrangement described thus provides method and means for effecting a material saving in the overall number of tubes required over what would be necessary if separate sets of tubes were used for providing $i$ current independently for each write "0" coil section 10. Use of the same set of three tubes $V_1$, $V_2$ and $V_3$ is made possible by the connection of all the write "0" coil sections 10 to the common line 12 to the electrical energy source of positive potential at A and by the connection of all write "0" coil sections and their associated balancing resistors 11 to the plate lead 13. In other words, the parallel connections of the seven branch circuits I–VII, inclusive, each consisting of a write "0" coil section 10 and a balancing resistor 11 between the common plus line 12 and the common plate lead 13 permits use of the single tube set $V_1$, $V_2$ and $V_3$ for providing $i$ current for all write heads simultaneously. Since the tubes $V_1$, $V_2$ and $V_3$ are used to provide the $i$ current for all seven bits of the channel, the cost per seven bit channel (because the $V_1$ tube is ½ of a $V_2$ or $V_3$ tube) is 2.5/7 tubes instead of 17.5/7 which would be the cost if separate sets of $V_1$, $V_2$ and $V_3$ tubes were used for each of the seven branch circuits I–VII, inclusive. Moreover, the use of common plus line 12 and also the use of the common plate lead 13 to the $V_2$ and $V_3$ tubes results in material savings in the costs of cabling and also reduces labor time needed to connect the circuit components together for operation.

While a specific embodiment of the invention has been described herein, variations in detail, substitutions and changes in circuit elements and components thereof within the scope of the appended claims are possible and are contemplated. There is no intention of limitation therefore to the exact arrangements herein shown and described.

What is claimed is:

1. In combination with a plurality of magnetic writing heads each having coils, said heads serving to effect magnetic writing of a first type or a second type of magnetic information on a magnetic surface, electrical circuit means for simultaneously supplying electrical writing current energy of a first kind and magnitude to all of said coils from a common electrical source so that all writing heads whose coils are only supplied with this current energy will effect magnetic writing of the first type, separate electrical circuit means for supplying electrical writing current energy of a second kind and different magnitude from said source independently to any selected coils of said plurality of coils simultaneously with the supply thereto of said writing current energy of the first kind and in opposition thereto to oppose the effect of the latter in selected heads and with the said selected coils effect magnetic writing of the second type, and selecting means included in said separate electrical circuit means for determining the coils to be selected, whereby all heads supplied only with said writing current energy of the first kind will effect magnetic writing of said first type and those selected coils which are additionally supplied with said writing current energy of the second kind will effect magnetic writing of said second type.

2. In combination with a plurality of magnetic writing heads each having coils, said heads serving to effect magnetic writing of a first type or a second type of magnetic information on a magnetic surface, circuit means including a common set of vacuum tubes for simultaneously supplying identical electric writing current energy of a first kind to all of such coils from a common source of electrical energy so that all writing heads whose coils are only supplied with said current energy will effect magnetic writing of the first kind, separate circuit means each including separate vacuum tubes for supplying electrical writing current energy of a second kind from said source independently to any of the said coils as may be selected simultaneously with the supply of electrical writing current energy of the first kind to all of said coils and in opposition thereto and with the selected coils thus provide a net writing current energy that will effect magnetic writing of a second kind, and selecting means included in said separate circuit means for determining the coils to be selected, whereby all coils supplied only with electrical writing current energy of the first kind will effect magnetic writing of a first kind, and those selected coils which are additionally supplied with electrical writing current energy of the second kind will instead effect magnetic writing of a second kind.

3. In combination with a group of magnetic writing head coils each consisting of a first coil section and a second coil section, said coils being adapted to effect magnetic writing of a first type of magnetic information or a second type of magnetic information on a magnetic surface as determined by the supply of electrical writing currents to the coil sections, a common electrical source, electrical circuit means for simultaneously supplying electrical writing current of a first kind and magnitude to all of the first sections of the coils from said source, and separate electrical circuit means connected independently to said source and to a different one of each said second coil sections for independently supplying each said second coil section as may be selected with electrical writing current of a second kind which is of different magnitude than said first named kind of current and in opposition thereto simultaneously with the supply of said first kind of current to all of said first coil sections, whereby all coils whose first sections only are supplied with said first kind of current will effect magnetic writing of said first type and those coils whose selected sectiond sections are additionally and simultaneously supplied with said current of the second kind will effect magnetic writing of said second type.

4. The invention of claim 3, including selecting means in the separate electric circuit means for selecting second coil sections which are to be supplied with said current of said second kind.

5. In apparatus of the character described a plurality of like magnetic writing head coils each comprising two coil sections, an electrical circuit commonly connected to one of the two sections of all of said coils, electron discharge means in said circuit to effect current flow of like intensity simultaneously in all of the commonly connected sections, means in said circuit for rendering said electron discharge means conductive to effect said current flow, electrical circuits one connected independently to each other section of each coil and separate electron discharge means in each of said last named electrical circuits to effect current flow in any selected ones of said other sections of said coils which is of different intensity from that flowing in their first named sections and in opposite direction thereto, and separate means in each of said last named electrical circuits for rendering the separate electron discharge means therein conductive to effect said last named current flow of different intensity in the said other coil sections as may be selected.

6. Circuital arrangements for energizing write head coils of a group of magnetic writing heads to effect magnetic writing thereby on a magnetic surface of either of two types of magnetic information comprising a common source of electrical energy, a set of electron discharge devices, an electric circuit connecting said devices in common to all of said coils and to said source, means for rendering said set of devices conductive so that energizing current of like determined magnitude flows simultaneously to said source through all of said coils in said circuit, a plurality of separate electron discharge devices, a separate electric circuit connecting each one of the latter named devices independently to a different one of said coils and to said common source, means for selectively rendering any of said latter named devices conductive so that energizing current of a second determined magnitude flows through the said separate electric circuits connected to the conductors of said last named devices through selected coils to the said electrical energy source simultaneously with the flow in said last named coils of the first named current and in opposing relationship thereto, whereby all heads whose coils are supplied only with the first named current will write one of the two types of magnetic information and all heads whose coils additionally and simultaneously are supplied with the second named current will write the other of the two types of magnetic information.

7. In apparatus of the character described, a plurality of magnetic writing head coil sections connected in multiple, a common source of electric energy connected to all the said sections, normally non-conductive vacuum tube means connected commonly to all said sections to provide flow of current of like magnitude simultaneously in all said sections to said source whenever said vacuum tube means become conductive, means for firing said vacuum tube means to render it conductive, second writing head coil sections each connected to a different one of the first named writing head coil sections, a plurality of independent normally non-conductive vacuum tubes connected separately each to a different one of said second sections and to said common source, means for firing any selected of said last named vacuum tubes to render those selected conductive thereby providing flow of current to said source through the second coil sections connected to the selected conductive vacuum tubes, said last named current having a different magnitude than that of said first named current and being in opposition thereto.

8. In apparatus of the character described a source of electric energy, a plurality of branch circuits connected in parallel each including a writing head coil section, a common lead connecting all said branch circuits to said source, normally non-conductive triode tubes connected commonly to all said branch circuits and in conjunction with said source to provide flow of current of like magnitude to said source simultaneously in all said branch circuits whenever said triode tubes become conductive, means for firing said tubes to render them conductive, separate second writing head coil sections each serially connected to a different one of the first named coil sections, a plurality of separate normally non-conductive triode tubes each connected separately to a different one of said second writing head coil sections and in conjunction with said source to provide flow of current to said source of different magnitude and direction than said first named current independently in any selected second coil section whenever the particular ones of said last named triode tubes connected to said selected sections are rendered conductive, and means for selectively firing any of said last named triode tubes to render them conductive.

9. In apparatus of the character described a source of electric energy, a plurality of branch circuits connected in parallel each including a writing head coil section, common cabling connecting all said branch circuits to said source, a pair of normally non-conductive twin triode tubes connected in multiple and commonly to all of said branch circuits and in conjunction with said source to provide flow of current of like magnitude and direction to said source simultaneously in all said branch circuits whenever said pair of twin triode tubes becomes conductive, means including a single control triode tube interconnected with said pair of twin triode tubes to render them conductive, separate second writing head coil sections each serially connected to a different one of said first named coil sections and also through said common cabling to said source, a plurality of separate normally non-conductive triode tube sections each connected separately to a different one of said second writing head coil sections and in conjunction with said source to provide flow of current to said source of different magnitude and direction than said first named current independently in any selected second coil section whenever the particular ones of said last named triode tube sections connected to said selected second coil sections is rendered conductive, and separate circuit means each including a control triode tube section connected to a different one of said normally non-conductive triode tube sections for selectively firing any of the latter to render them conductive.

10. In apparatus for writing magnetic information which is either a "0" or a "1" fragment of information, a group of coils each comprising a write "0" section and a write "1" section, a common lead connecting one terminal of all the write "0" sections and one terminal of all the write "1" sections to a common source of positive electric potential, a second common lead connected to the other terminals of all the write "0" sections, separate additional leads one connected respectively to a different one of each other terminal of the write "1" sections, a single set of normally non-conducting triode vacuum tubes connected to said second-named common lead, a firing vacuum tube connected to said set of vacuum tubes, an "and" circuit connection to said firing vacuum tube to fire the latter and thereby render said set of triode tubes conducting to permit an "$i$" current to flow simultaneously through each write "0" coil section to the said source, a normally non-conducting triode tube connected independently to each different one of said separate additional leads, a firing vacuum tube for each said last named triode tube, separate "and" circuit connections to each said last named firing tube to fire each independently as desired and thereby render that last named triode tube associated therewith conducting, any of said last named triode tubes being rendered conductive causing a $2i$ current to flow to said source through the write "1" coil section connected therewith simultaneously and in opposite direction to the $i$ current flowing in the write "0" coil sections, whereby all coils in whose write "0" sections current $i$ only flows will effect magnetic writing of "0" information and those coils in whose respective sections current "$i$" and current $2i$ flow simultaneously and oppositely will effect magnetic writing of "1" information.

References Cited in the file of this patent

UNITED STATES PATENTS

| | | |
|---|---|---|
| 2,633,402 | Fleming | Mar. 31, 1953 |
| 2,679,551 | Newby | May 25, 1954 |